United States Patent [19]

Shah et al.

[11] Patent Number: 5,535,341
[45] Date of Patent: Jul. 9, 1996

[54] APPARATUS AND METHOD FOR DETERMINING THE STATUS OF DATA BUFFERS IN A BRIDGE BETWEEN TWO BUSES DURING A FLUSH OPERATION

[75] Inventors: Nilesh Shah; Rajeev Prasad, both of Folsom, Calif.

[73] Assignee: Intel Corporation, Santa Clara, Calif.

[21] Appl. No.: 201,819

[22] Filed: Feb. 24, 1994

[51] Int. Cl.$^6$ ............... G06F 3/04; G06F 13/00
[52] U.S. Cl. ............ 395/306; 395/309; 395/872; 395/878; 370/85.13
[58] Field of Search ................. 395/325, 306, 395/309, 872, 879, 878; 370/85.13

[56] References Cited

U.S. PATENT DOCUMENTS 5,117,486  5/1992  Clark et al. ............... 395/250
5,179,706  1/1993  Swanson et al. ........... 395/725

Primary Examiner—Jack B. Harvey
Assistant Examiner—Jeffrey K. Seto
Attorney, Agent, or Firm—Blakely, Sokoloff, Taylor & Zafman

[57] ABSTRACT

A bridge circuit adapted to be associated with first and second bus circuits which bridge circuit includes a first path including a plurality of buffers for storing data or addresses being transferred from the second bus to the first bus, a circuit arrangement for detecting that an interrupt of a presenting-running operation has occurred, a circuit arrangement for determining the state of the plurality of buffers when an interrupt occurs, and apparatus for flushing only those buffers of the plurality which were storing data for transfer when the interrupt occurred.

23 Claims, 7 Drawing Sheets empty filled before APIC interrupt received filled after APIC interrupt received

APPARATUS AND METHOD FOR DETERMINING THE STATUS OF DATA BUFFERS IN A BRIDGE BETWEEN TWO BUSES DURING A FLUSH OPERATION

BACKGROUND OF THE INVENTION

1. Field of the Invention

This invention relates to computer systems, and more particularly, to methods and apparatus for accelerating the transfer of data in a computer system utilizing multiple buses.

2. History of the Prior Art

Historically, personal computers have utilized a single bus to transfer data between different internal components of the system. In personal computers using central processing units designed and manufactured by Intel Corporation of Santa Clara, Calif., such buses have typically been designed as either an Industry Standard Architecture (ISA) bus or an Expanded Industry Standard Architecture (EISA) bus. The ISA bus is a sixteen bit data bus while the EISA bus is thirty-two bits wide. Each of these buses functions at a frequency of eight megahertz. The data transfer rates provided by these bus widths and operational frequencies have been found limiting so there have been a number of attempts to increase bus speed.

One recently implemented method of increasing bus speed is to provide an additional, so called, "local bus" which is more closely associated with the central processor than either of the above-mentioned buses and which is capable of running at speeds that more closely approximate the speed at which the processor itself runs. Those system components which require faster operation than has been available using the slower buses (such as an output display card for an output display device) are joined to this faster local bus. However, it is most desirable to be able to continue to utilize those components which were designed to operate with the older buses and which operate at a slower rate. In order to do this, the slower ISA or EISA bus is maintained in essentially unchanged form; and those components which are able to tolerate longer access times are associated with the slower bus. It is then necessary to provide arrangements by which data may be transferred between all of the computer system components. This requires complicated interfacing arrangements. Although the theory behind using a local bus is good, many local bus designs have created conflicts in accessing components which actually slow the operation of the computer.

Intel Corporation has designed a new local bus which may be used in a computer system including other buses such as an ISA bus or an EISA bus (which are hereinafter referred to broadly as secondary buses). This new local bus provides faster throughput of data for selected components of the system without the conflicts which arise using other local bus systems. This new bus is referred to as the "peripheral component interconnect" (PCI) bus. A computer system using this PCI bus includes in addition to the physical PCI bus a first bridge circuit which provides the interface and controls the transfer of data among the PCI bus, the central processing unit, and main memory. A second bridge circuit is also provided as an interface between and a control for the transfer of data between a secondary bus and the PCI bus. Thus, the arrangement is such that components on the PCI bus transfer data to and receive data from main memory through the first bridge which joins to the central processor and to the main memory; while components on the secondary bus transfer and receive data through the second bridge and through the PCI bus for transfers with components on the PCI bus, and through the first and second bridges and the PCI bus for transfers with the central processor and the main memory.

Various designs of secondary bridges have been proposed. Specific embodiments of such bridges are described in detail in a publication entitled 82420/82430 *PCIset, ISA and EISA Bridges,* 1993, Intel Corporation. The design of these bridges is complicated by various factors. For example, each of the PCI and secondary buses is designed with controlling rules of operation which must be adhered to in designing a bridge to connect the two disparate buses. The PCI bus has been designed as a thirty-two bit bus. The PCI bus joins to the central processing unit and main memory through the first bridge circuit which is designed to buffer transfers of data so that a faster processor need not slow to the speed of the bus in transferring data. Because of this buffering arrangement, it is a requirement that write operations on the PCI bus be completed before any read operation of memory is allowed so that the coherency of the buffered write data is maintained when a write operation is interrupted. This requires that write data stored in buffers in each of the first and second bridges be flushed to its destination before the read process can commence. For many other similar reasons, flushing the data buffers of the bridges is required.

One of the operations which requires buffer flushing is the generation of an interrupt. In most cases an interrupt is an indication that some device requires service; in other cases, an interrupt signals the end of a data transfer. Such an interrupt indicates that a presently-running operation is to be interrupted or ended and a new operation is to be initiated. In such a case, it is necessary that write data stored in the data buffers be written to destination addresses (flushed) before the interrupt is acknowledged and serviced. Historically, this has been accomplished by an assertion by a device of an interrupt to an interrupt controller. The interrupt controller historically used with Intel processors physically resides with the circuitry which controls the operations on the secondary bus. In the case of a system utilizing a PCI bus, this circuitry resides in the bridge between the two buses and utilizes control signals used by other operations on the PCI bus. The interrupt signal generated by the secondary bus master causes the interrupt controller to generate a signal which is transferred to the CPU to indicate that some device requires servicing. The CPU completes the specific operation in which it is involved and generates an interrupt acknowledge cycle on the PCI bus. Since the interrupt controller resides in the bridge and utilizes the same signaling paths used by other components situated in the bridge, it recognizes the interrupt acknowledge cycle and generates signals to alert the bridge that a buffer flush is necessary so that the bridge buffers can be flushed before the interrupt is begun. When the flush of the buffers in both the first and second bridge circuits has been completed, the interrupt controller sends an interrupt vector to the CPU. This vector contains the address in memory of the interrupt handler routine for highest priority interrupt existing at the time the interrupt vector is sent. The CPU accesses the interrupt handler routine and services the interrupt.

However, a new interrupt controller called the Advanced Programmable Interrupt Controller (APIC) has been designed by Intel Corporation and is now being included in some systems which utilize a PCI bus. This new controller has various advanced abilities including the ability to provide programmable levels of interrupts, to handle both hardware and software interrupts, and to transfer interrupts among multiple processors. The APIC controller polls its input lines and generates an interrupt which is sent directly to the central processing unit. To accomplish this, the APIC controller is closely associated with the central processing unit rather than with the secondary bus controller circuitry. An APIC interrupt controller utilizes its own busing paths to transfer control signals. These busing paths are separate from those used by other circuitry associated with the PCI bus. Consequently, when the CPU responds to an APIC interrupt, there is often no signal present in the normal bridge control paths to alert the bridge circuitry that a flush is necessary. However, the APIC interrupt controller and the CPU must still cause the bridges to be flushed before the acknowledgment of the interrupt and the subsequent transfer of the interrupt vector to the CPU may be accomplished.

More importantly, a secondary bus master which has access to the secondary bus when an interrupt occurs cannot be forced to relinquish its ownership of the secondary bus until its operation is complete. Even so, it is sometimes necessary to interrupt the operations of such a bus master directed to the PCI bus and to read from memory as it exists at the time of the interrupt. This means that the data in buffers at the instant the interrupt occurs should be flushed to its ultimate destination. On the other hand, if a secondary bus master is transferring data through the bridge buffers to the PCI bus, the fact that the secondary bus master must wait for the PCI bus does not stop the transfer of data to the bridge buffers. In fact, it may continue to load these buffers after the interrupt occurs so long as buffer space exists and may require a substantial period before it completes its operations. Continuing the buffer filling is desirable since it helps maintain a higher data transfer rate on the secondary bus. Therefore, in order to improve performance of the APIC controller without affecting the optimized secondary bus performance due to the buffering scheme, it is desirable to flush only those buffers which include data written before the interrupt was generated. It is also desirable to flush those buffers as soon as possible so that an interrupt can be acknowledged and serviced. Consequently, it is necessary to provide some means of ascertaining which buffers were filled at the point an APIC interrupt was generated.

SUMMARY OF THE INVENTION

It is, therefore, an object of the present invention to provide an improved bridge circuit capable of rapidly transferring data and addresses between buses in a multiple busing system and capable of providing automatic flushing of bridge buffers in response to an APIC interrupt signal.

It is another object of the present invention to provide circuitry capable of rapidly flushing bridge buffers of data present in those buffers at the generation of an interrupt signal in an improved bridge circuit transferring data and addresses to and from both a PCI bus and a secondary bus in a multiple busing system.

It is another more specific object of the present invention to provide circuitry capable of providing data representing the state of buffers in a bridge circuit joining two buses at the instant an interrupt occurs.

These and other objects of the present invention are realized in a bridge circuit adapted to be associated with first and second bus circuits which bridge circuit includes a first path including a plurality of buffers for storing data or addresses being transferred from the second bus to the first bus, a circuit arrangement for detecting that an interrupt of a presently-running operation has occurred, a circuit arrangement for determining the state of the buffers when an interrupt occurs, and means for flushing only those buffers of the plurality of buffers which were storing data for transfer when the interrupt occurred.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
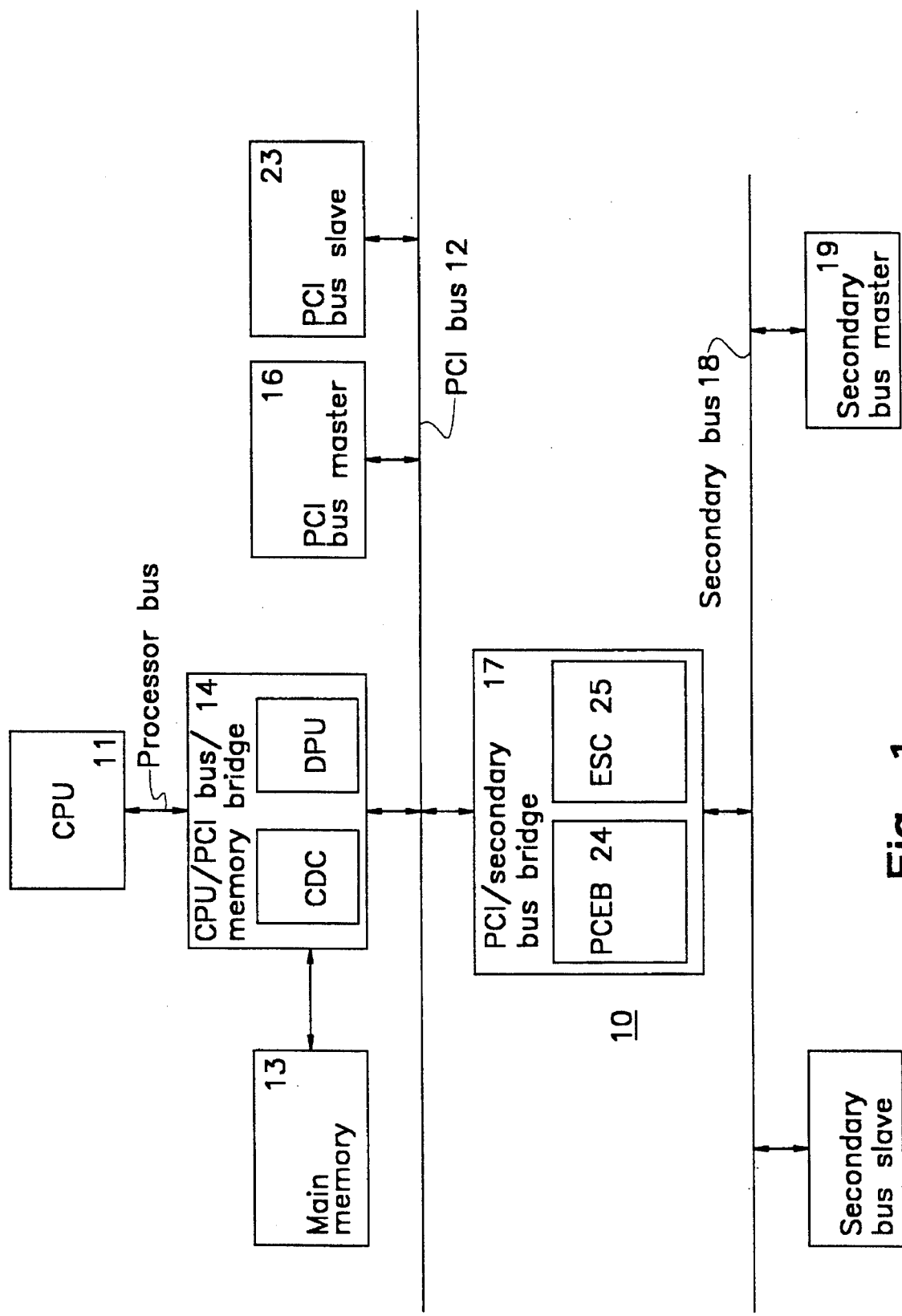
FIG. 1 is a block diagram of a computer system including a plurality of buses including at least a PCI bus and a secondary bus.

Referring now to FIG. 1, there is illustrated a computer system 10. The system 10 includes a central processor 11 such as an Intel i486™ microprocessor which carries out the various instructions provided to the computer 10 for its operations. The central processor 11 is joined to a bus 12 adapted to carry information to various components of the system 10. The bus 12 is designed as a PCI bus in order to allow the transfer of data to and from the central processor 11 at a rate faster than is possible with the typical ISA or EISA buses used by the prior art. The processor 11 is joined to the bus 12 by a bridge circuit 14 which is adapted to provide various functions necessary to the transfer of data. Also joined to the PCI bus 12 by the bridge circuit 14 is main memory 13 which is typically constructed of dynamic random access memory arranged in a manner well known to those skilled in the prior art to store information during a period in which power is provided to the system 10. The bridge circuit 14 is physically constructed to include both a cache and dram controller (CDC) chip and a data path unit (DPU) chip each of which is manufactured by Intel Corporation of Santa Clara, Calif. Detailed descriptions of these chips are provided in *Cache & DRAM Controller (CDC) 82424TX* and *Data Path Unit (DPU) 82423TX*, each published by Intel Corporation.

The bridge 14 includes circuitry for interfacing the central processor 11 and main memory 13 to the bridge 14, circuitry for interfacing the bridge 14 to the PCI bus 12 as either a bus master or a bus slave, and cache control and data synchronization circuitry. In general, the bridge circuit 14 includes circuitry for controlling and accomplishing the transfer of data among the central processor 11, main memory 13, and the PCI bus 12. Among the circuitry included in the bridge 14 and specifically in the data path unit are a number of buffer circuits which may store data being transferred among the central processor 11, main memory 13, and the PCI bus 12. As has been set out above, the buses historically used with Intel microprocessors in computer systems (ISA and EISA buses) do not run as fast as is desirable. For this reason, the new PCI bus has been designed to run at a speed closer to the speed of the processors. A faster data transfer rate has been accomplished by utilizing a bus width of thirty-two bits, by allowing operations at increased frequencies, and by buffering data transfers. Buffering has been provided in the bridge circuit 14 so that a CPU 11 operating at a higher data transfer rate than the PCI bus 12 may store data in the bridge and continue with other operations while the bridge completes the transfer of stored data. This buffering of data greatly improves the speed of data transfer in the computer system 10 but requires that strong ordering and coherency protocols be enforced in data transfer operations.

Also connected to the PCI bus 12 is a PCI bus master circuit 16 which may be one of a number of different component circuits. The main properties of a PCI bus master are that it includes a microprocessor or controller which functions at some internal clock rate and that it may initiate and control operations on the PCI bus 12. A PCI slave circuit 23 may also be connected to the PCI bus 12. Such a PCI slave circuit 23 may be, for example, a video output card having a frame buffer adapted to store video signals to be transferred to an output device such as a monitor for display.

Also connected to the PCI bus 12 is a PCI/secondary bus bridge circuit 17. The bridge circuit 17 performs the various functions necessary to transfer data between the PCI bus 12 and a secondary bus 18 so that the data may be used by various component circuits joined to the secondary bus. The secondary bus 18 may be an ISA bus, an EISA bus, or a similar bus, any of which typically transfers data at a rate slower than the bus 12. One specific PCI to secondary bridge circuit 17 used with an EISA secondary bus includes a pair of integrated circuit chips referred to respectively as a PCI/EISA bridge (PCEB) 24 and an EISA System Controller (ESC) 25. These integrated circuit chips are manufactured by Intel Corporation and are described in detail in the publication entitled 82420/82430 *PCIset, ISA and EISA Bridges*, referred to above. In general, the PCEB chip 24 includes circuitry for transferring data between the two buses, while the ESC chip 25 includes circuitry for controlling access to the secondary bus.

Such a bridge 17 includes circuitry for providing the interface between the PCI bus 12 and the secondary bus 18 so that data may be transferred therebetween. Among this circuitry are a number of data buffers adapted to store data being transferred between the two buses. To facilitate the data transfer, the bridge 17 provides circuitry generally in the PCEB chip 24 which allows it to operate as an intercoupling bus master or a bus slave on the PCI bus 12. The bridge 17 also provides circuitry generally in the ESC chip 25 which allows it to operate as an bus master or a bus slave on the secondary bus 18. The ability of the bridge 17 to act as a PCI bus master and a secondary bus slave allows a bus master circuit 19 positioned on the secondary bus 18 (for example, local area network circuitry) to gain access to the PCI bus 12 and thence to the main memory or other components joined to the PCI bus 12. The ESC chip 25 also includes various other circuits typically used in Intel processor-based computer systems. For example, in an embodiment with which the present invention is concerned, the ESC chip 25 includes two interrupt controllers which are discussed in detail hereinafter. The bridge 17 may also include a first arbiter circuit for controlling access to the PCI bus 12 and a second arbiter circuit for controlling access to the secondary bus 18.

As described above, buffering is provided in the bridge circuit 17 (as well as in the bridge circuit 14) to store data being transferred between the PCI bus and the secondary bus. Buffering in the bridge circuit 17 which joins the two buses 12 and 18 offers substantial advantages. For example, when a faster bus is trying to write to a slower bus without buffering, the speed of the transfer necessarily slows to the speed at which the slower bus can accept the data. When transferring in the other direction without buffering, the speed of transfer to the faster bus can only approach the speed at which the components on the slower bus are able to transfer data.

Figure 2:
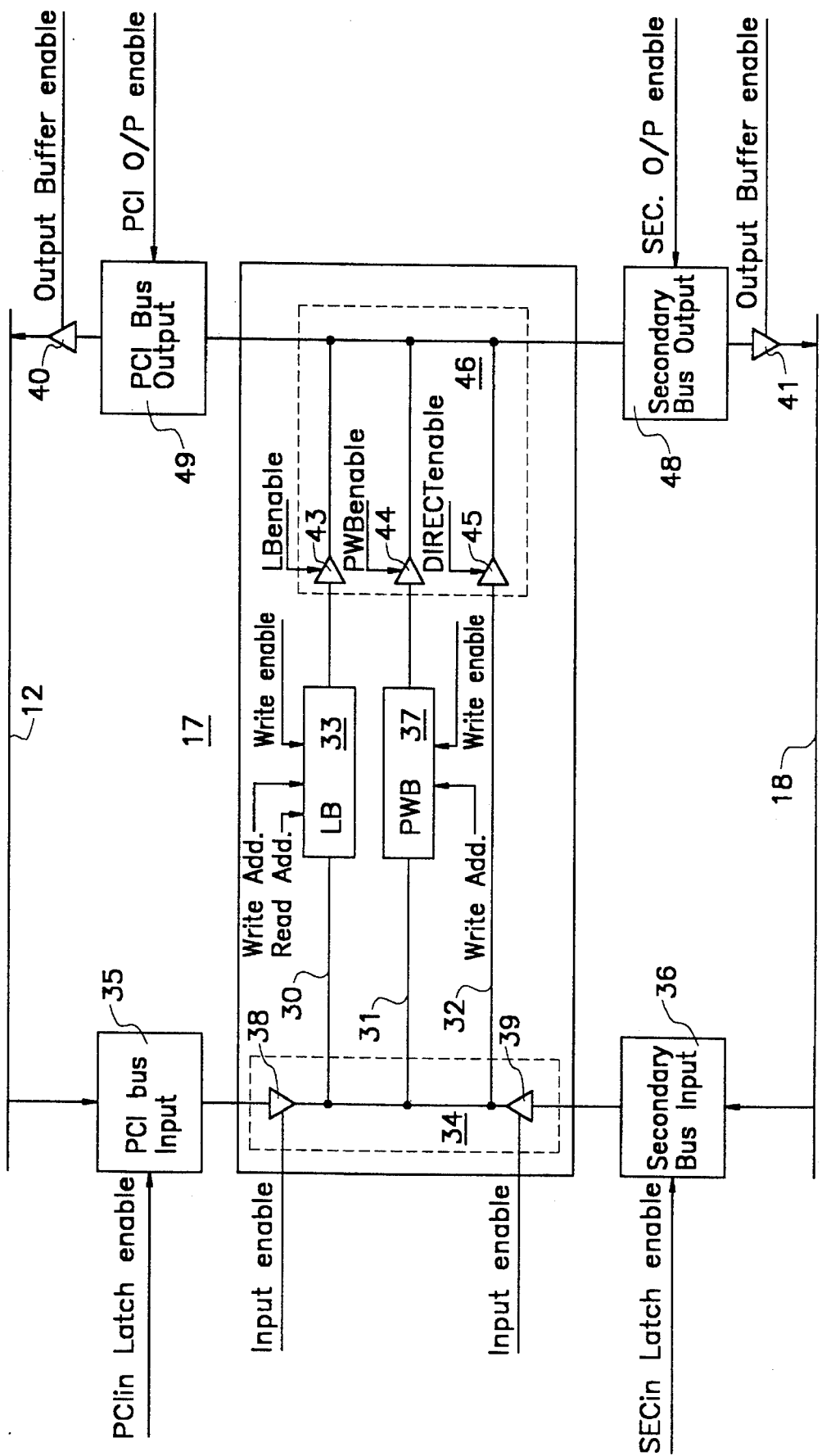
FIG. 2 is a block diagram of a bridge circuit for connecting a PCI bus and a secondary bus in accordance with the present invention.

Referring now to FIG. 2, there is illustrated a block diagram of a data transfer portion in one embodiment of a bridge circuit 17 such as that illustrated in FIG. 1 which is designed in accordance with the present invention to accomplish the transfer of data between the two buses 12 and 18 of the computer system. It should be noted that in one embodiment of the bridge circuit 17 with which the present invention is utilized an essentially identical address transfer portion is utilized for transferring addresses between the buses 12 and 18. From this point on, the description may be considered to explain the operation of both data and address transfer portions. The data transfer circuitry of the circuit 17 includes three individual paths which may transfer data between the PCI bus 12 and a secondary bus 18. The first of these three paths 30 includes a line buffer 33 (a plurality of individual buffers in one embodiment) in which data may be stored which is being transferred during read and write operations. Typically data is stored in this buffer when a read transfer is being accomplished from the faster to the slower bus, i.e., when the slower secondary bus is reading from the PCI to the secondary bus or when a write operation is being accomplished from the slower to the faster bus. The second path 31 includes a posted write buffer 37 in which data being written from the faster to the slower bus is typically stored. The third path is essentially a direct connection 32 for information which need not (or may not) be stored during transfer between the buses. This third path 32 allows data to be taken directly from memory and transferred to the secondary bus without buffering.

Each of these three paths is connected to receive input data transferred by a multiplexor 34. In the figure (which represents only one possible embodiment of the circuitry), the multiplexor 34 is represented by a pair of tristate devices 38 and 39 which may be enabled to allow input from either of the buses. The multiplexor 34 receives input signals from input latches 35 and 36 connecting to each of the two buses 12 and 18 under control of enabling signals furnished when a particular bus master gains access to the bus and the bridge circuitry. Only one of the two buses may transfer signals at any instant. Consequently, only one of the inputs to the multiplexor 34 from the latches will be selected at any time. Each of the three paths is also connected to provide outputs to a pair of output buffer circuits 40 and 41 which may be enabled to transfer the data to either the secondary bus 18 or the PCI bus 12. Consequently, any amount of data may be sent from either the PCI bus or the secondary bus to the other one of the two buses through any of the paths without having to transit any significant circuitry or gating which might require significant clock delays in the transfer.

As may be seen, each of the three paths includes a tristate device 43, 44, or 45 which when enabled allows the transfer data through that particular path from the sending bus to the receiving bus. Each of the two paths which includes storage buffers 33 or 37 also includes circuitry for furnishing control signals to enable that buffer so that the correct storage buffer and path may be selected for the particular read and write operation which is taking place. It should be noted that the three tristate devices 43, 44, or 45 are one embodiment of what may be considered to be a multiplexor 46 to a single output path leading to each of the two buses 12 and 18.

As is illustrated in FIG. 1, the PCI bus has been integrated into computer systems along with the older buses so that components designed for the older buses may continue to be used. A number of problems have arisen in attempting to integrate buses designed with substantially different characteristics into the same computer system. For example, one problem which has arisen with integrating the newer PCI bus into a computer system with the older secondary buses is that data in the buffers in each of the bridges which join to the PCI bus should be flushed so that data posted to those buffers arrives at its destination before a new operation may commence which might conceivably utilize that data. One of the operations which requires flushing of the data in the bridge buffers is the generation of an interrupt by a bus master. Such a signal indicates that a continuing operation may have to be interrupted or a completed operation has ended and a new operation is to commence. Consequently, the data posted to buffers in the bridges by the continuing operation must be flushed from the buffers of the bridges and sent to its destined address so that the data at the destined address will, in fact, be valid if it is accessed by the interrupting operation.

On the other hand, when operating with these older buses, the PCI bus and its interfacing circuitry must also be adapted to allow, as well as possible, the operations on the older buses to continue at their best speed. As pointed out above, the secondary buses and components which join thereto were designed so that a bus master which gains access to the secondary bus retains control of that bus until it has completed its operations and then relinquishes the bus to some other component. So long as secondary bus masters are only transferring data on the secondary bus, this is not a problem. However, a secondary bus master such as a DMA device will often need to read or write data from or to main memory. To do this, the secondary bus master must use the abilities of the bridge 17 as a PCI bus master to gain access to the PCI bus 12. However, operations on the secondary bus are relatively slow; and, because a bus master on the ISA and EISA buses cannot be forced off the bus until it has completed its operations, once a bus master on the secondary bus owns the secondary bus, it precludes PCI components from gaining access to the secondary bus. For this reason it is desirable to allow a secondary bus master which has access to the secondary bus to complete its operation as soon as possible so that the bus will be available.

Historically, computers utilizing microprocessors manufactured by Intel Corporation of Santa Clara, Calif., such as the 8088, 8086, 80186, 80286, i386™, and i486™ microprocessors (herein referred to as the Intel processors) have used an Intel 8259 programmable interrupt controller (PIC) or an interrupt controller patterned thereon. This interrupt controller provides interrupt signals to an associated processor in response to interrupt signals generated by various hardware devices associated with the processor. In these older systems, an interrupt is generated by a bus master which sends an interrupt signal to the 8259 interrupt controller. Normally this interrupt controller physically resides with the circuitry which controls the operations on what (in PCI bus systems) has become the secondary bus and utilizes the same signaling paths as are utilized for controlling access to that bus. In the case of a system utilizing the PCI bus, this circuitry may reside in the bridge 17 between the two buses and specifically in the ESC chip 25. The signal generated by the secondary bus master causes the interrupt controller to generate an interrupt signal which is transferred to the central processor. The central processor completes its immediate operation and then generates an interrupt acknowledge signal to the interrupt controller. Normally, with a typical interrupt controller, the interrupt acknowledge signal would cause the interrupt controller to send an interrupt vector to the central processor containing the address of the interrupt handler routine for the highest priority interrupt outstanding. However, in systems having buffers in bridges joining the buses, before the interrupt vector can be sent to the processor, the secondary bus circuitry has to make sure that all of the buffers have been flushed so that the interrupt routine will not operate with invalid data. Since the interrupt controller which receives the request for an interrupt resides with the secondary bus control circuitry in the bridge and utilizes the same signaling paths, it is easy to utilize the interrupt acknowledge from the central processor to alert the bridge that a buffer flush is necessary. The circuitry controlling data transfers in the bridge 17 cooperates with the interrupt controller to clear the buffers before responding to the interrupt acknowledge from the central processor with an interrupt vector. Thus, the bridge buffers may be rapidly flushed without delaying operations on the PCI bus.

However, with more advanced computers running advanced operating systems, it is desirable to be able to change the priority level at which interrupt signals from a particular hardware component are handled as the circumstances of operation change and to coordinate the priority levels of hardware interrupts and of interrupts associated with software processes (tasks). To accomplish this, a new interrupt controller (designated the Intel 82489DX Advanced Programmable Interrupt Controller (APIC)) has been designed for use in computer systems with Intel processors. This controller provides programmable interrupts for both tasks and devices and includes facilities for transferring interrupts between processors in a multiprocessor system. The APIC controller is described in detail in a publication entitled 82489*DX Advanced Programmable Interrupt Controller*, published by Intel Corporation of Santa Clara, Calif.

The APIC controller is now being included in systems which utilize a PCI bus. Although these controllers have various advanced abilities, the APIC controllers are closely associated with individual central processing units rather than with the secondary bus controller circuitry. Although the APIC controller may physically reside with the circuitry of the ESC chip 25 of the bridge 17, it utilizes its own signaling paths and sends interrupts directly to the central processing unit rather than utilizing the signaling paths used by the other circuitry in the bridge 17. Because the interrupts are sent directly to the processor, there has been no signal present in the normal signal paths at the bridge level when an APIC interrupt occurs to alert the bridge data transfer circuitry that a flush is necessary and to accomplish the interrupt acknowledge procedure. Thus, when the central processor acknowledges the APIC interrupt, the bridge buffers may still contain data which needs to be flushed before the interrupt is acknowledged and serviced.

This is a particular problem when a secondary bus master has gained access to the secondary bus at the time an APIC interrupt occurs and is transferring data using the line buffers of the bridge to a component on the PCI bus since a secondary bus master is designed so that it does not relinquish the secondary bus until it has completed its operations. Were an interrupt signal to be provided at the bridge level, the bus master could be stopped at the time the interrupt was received. However, since the secondary bus transfer rate is so much slower than the transfer rate on the PCI bus, it is desirable to continue filling the bridge buffers. If the secondary bus master is allowed to continue filling the bridge buffers, it may be some time before the transfer operation is completed so that the bridge buffers may be flushed. With prior art arrangements, this means that the acknowledging and servicing of the interrupting operation will be delayed. Moreover, if the secondary bus master continues filling the buffers after the interrupt until its operation is complete, a substantial amount of additional data may have been stored in the line buffers of the bridge 17 by the secondary bus master which will need to be flushed. It will be recognized that the flushing of each additional buffer is time consuming and further extends the time before the interrupt can be serviced.

The present invention provides an arrangement by which an interrupt generated by an APIC controller may be immediately implemented while the secondary bus master may continue to transfer data into the buffers of the bridge between the two buses. In order to achieve this, the arrangement is devised to flush only those buffers which include data written before the interrupt was generated. To accomplish this, the present invention includes means of ascertaining which buffers were filled in the secondary bridge and the state of the secondary bridge in terms of activities on the PCI and secondary buses at the point at which the interrupt was generated.

Figure 3:
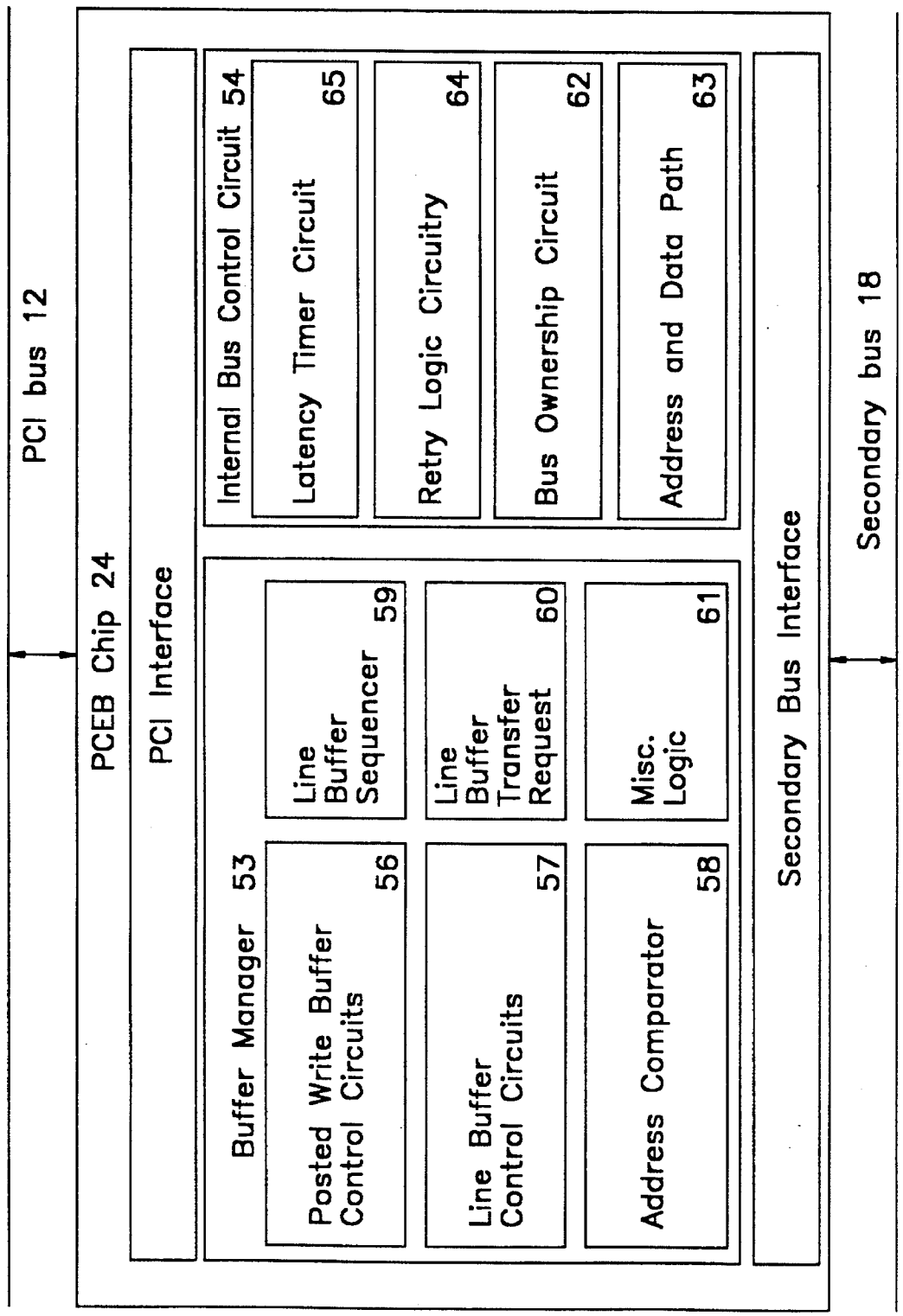
FIG. 3 is a more detailed block diagram of the bridge circuit illustrated in FIG. 2 for connecting a PCI bus and a secondary bus in accordance with the present invention.

FIG. 3 illustrates a functional block diagram of the control circuitry of the PCEB chip 24 of the bridge circuit 17. As may be seen in FIG. 3, PCI interface circuitry is arranged to provide an interface for transferring data and addresses to and from the PCI bus. In a similar manner, secondary bus interface circuitry is arranged to provide an interface for transferring data and addresses to and from the secondary bus (e.g., an EISA bus). Within the PCEB chip 24 are arranged a buffer manager circuit 53 and an internal bus control circuit 54. The buffer manager 53 includes control circuitry 56 including state machines for causing the operation of posted write buffers 37; control circuitry 57 including state machines for causing the operation of line buffers 33; address comparator circuitry 58 for controlling selection of particular buffers and bytes, word, and double word portions of individual buffers; a line buffer sequencer 59 which aids in controlling sequencing through the individual portions of the line buffer 33; a line buffer transfer request circuit 60; and various miscellaneous logic 61. The internal bus control circuitry 54 includes a bus ownership control logic circuit 62 which incorporates logic including state machines for controlling and determining at any time the ownership of the various data paths through the PCEB chip 24. The circuitry 54 also includes the address and data paths 63 including the physical line buffers 33 and posted write buffers 37 illustrated in FIG. 2 above. A retry logic circuit 64 with a number of state machines which track the status of the various components of the bridge 17 and the condition of the buses and an EISA latency timer circuit 65 are also a part of the internal bus control circuit 54.

Figure 4:
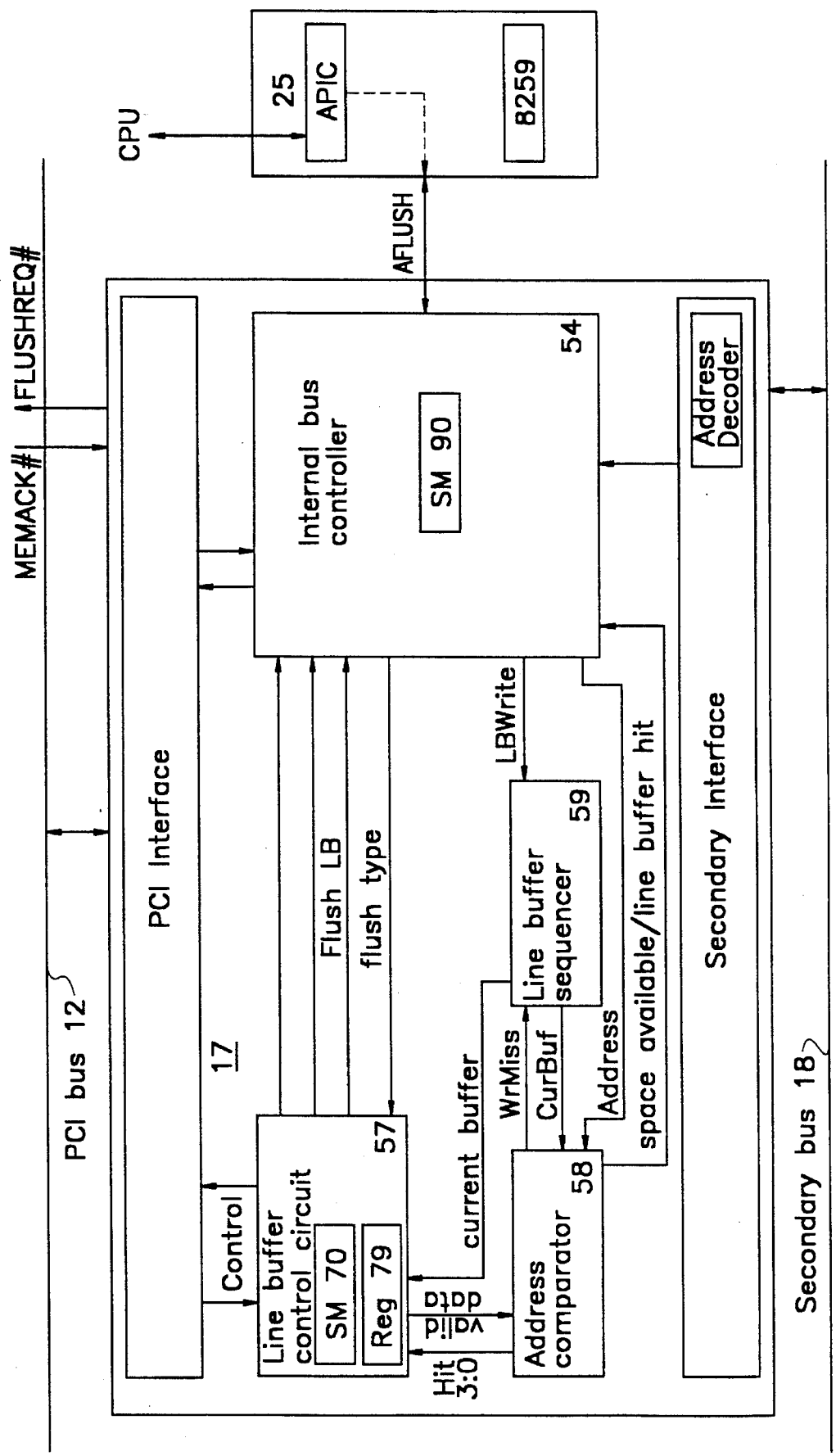
FIG. 4 is a more detailed block diagram of a portion of the bridge illustrated in FIG. 3 used in carrying out the invention.

Referring now to FIG. 4, there is illustrated a block diagram of that portion of the bridge circuit 17 used to accomplish the present invention. The circuitry includes the internal bus controller 54 which includes the various circuitry discussed above for accomplishing the operations of managing the line buffers 33 in the PCEB chip 24 of the bridge 17. Also illustrated is the line buffer control circuit 57 which physically controls the signals applied to the line buffers 33 during transfer of the data between the two buses. The PCI interface circuit provides an interface between the PCI bus and the bridge 17 and includes circuitry which accomplishes the actual transfer to the PCI bus 12. The line buffer sequencer circuit 59 and the address comparator 58 receive signals from the internal bus controller 54 by which the pointers and control signals for controlling the line buffers are generated.

A conductor provides a signal called AFLUSH from the APIC controller which resides in the ESC chip 25. The AFLUSH signal indicates to the internal bus controller 62 that the APIC controller is awaiting the interrupt acknowledge handshake so that the bridge 17 can react and flush the line buffers 33 if necessary before sending an interrupt vector to the CPU 11. The AFLUSH signal is transferred to the internal bus control circuit 54. This special signal is provided in addition to the normal control signals provided to the CPU 11 by the APIC controller and indicates to the internal bus control circuit 54 that an APIC controller has received an interrupt from a device or task which is being transferred to the CPU 11 for action. The provision of this special AFLUSH signal resolves the problem of knowing when a flush of the line buffers 33 must occur in response to an APIC-generated interrupt.

Figure 5:
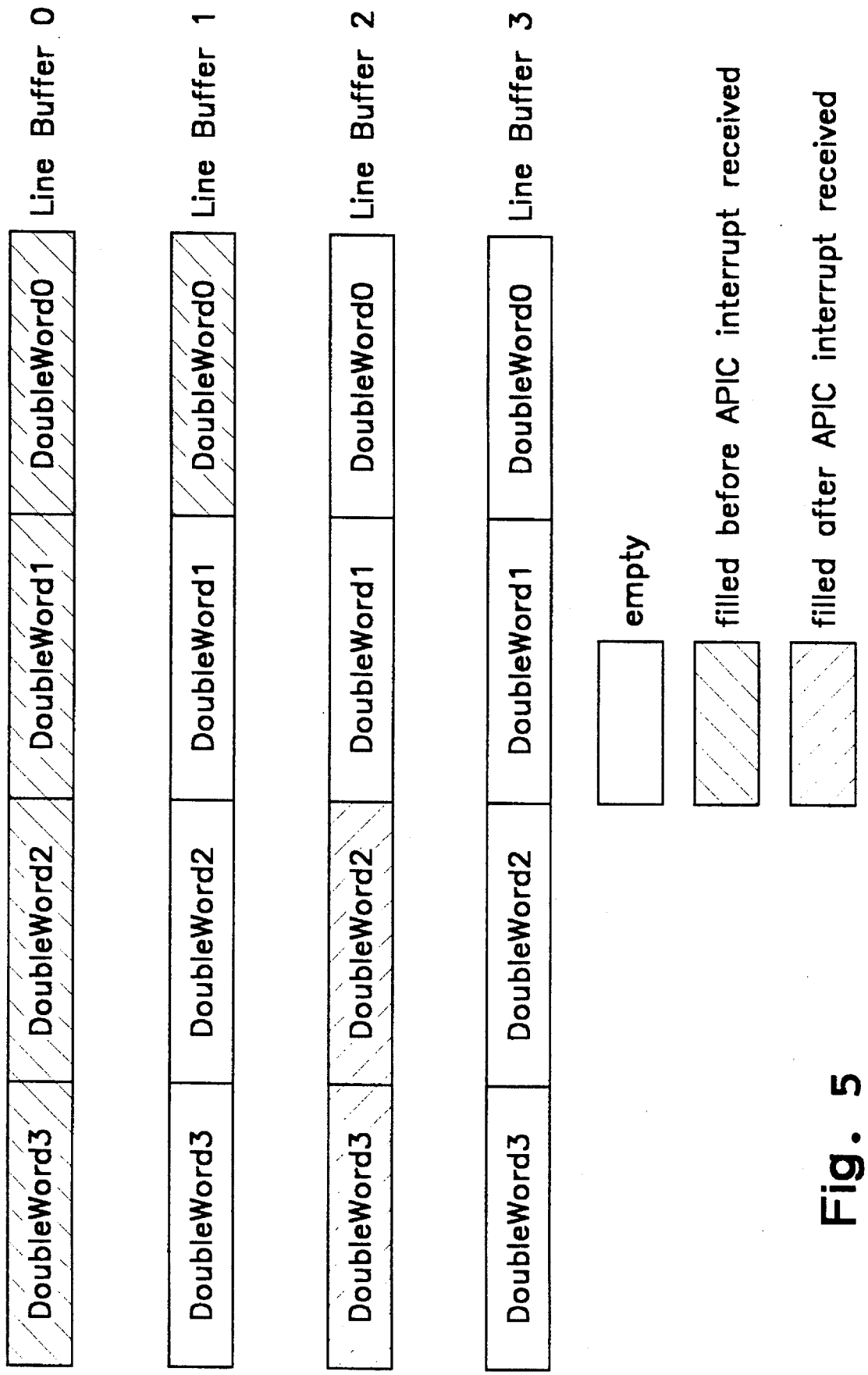
FIG. 5 is a diagram illustrating the arrangement of line buffers in one embodiment of the invention.

FIG. 5 illustrates one arrangement of line buffers 33. This arrangement includes four individual line buffers each capable of storing four doublewords of thirty-two bits each. Thus, the entire line buffer arrangement provides storage for a total of sixteen doublewords of data. In that same embodiment, each data line buffer has a thirty-two bit address associated with it which is transferred by the address line buffer mentioned above. The twenty-eight most significant bits of the address are used to indicate the particular data line buffers and address line buffer in which data and addresses are stored, while the next two least significant bits of the address (bits 3:2) indicate the particular doubleword space for data within a line buffer.

At the point at which the AFLUSH signal is received, it will be presumed that a secondary bus master has access to the secondary bus and is transferring data to the PCI bus 12. To accomplish this, the secondary bus master would typically perform the following operations. A secondary bus master gains access to the secondary bus by a secondary bus arbitration. The bus master then asserts an address on the bus 18 and shortly thereafter furnishes control signals indicating that the operation is to start, whether the operation is a read or a write operation, and whether the operation is an input/output cycle or a memory cycle. This information is decoded at the secondary bus interface of the PCEB chip 24 and a determination is made whether the bridge 17 is the secondary bus slave which is being addressed.

When the bridge 17 is being addressed, the logic circuitry of the secondary bus interface ascertains from the internal bus controller 54 whether it should continue the operation or whether it should issue a wait signal to the secondary bus master. To accomplish this, the internal bus controller 54 transfers the address to the address comparator 58 which determines whether space is available in the line buffers 33. The address comparator 58 compares the twenty-eight most significant bits of the address with the current address held by the current one of the line buffers 33. The line buffer 33 which is currently in use is pointed to by the sequencer 59. After each secondary bus ownership change, the line buffers 33 are emptied, so at the beginning of any new transfer, the line buffer sequencer 59 signals to the address comparator 58 that line buffer 0 is the current address. The address comparator 58 looks for a match with the current address in the address line buffer. Although it does not see a match since no address is held in the line buffers 33, it does receive signals from the line buffer control circuit 57 indicating that the line buffers 33 are empty, so it indicates to the internal bus control circuit 54 that a hit has occurred. The hit indication allows the internal bus control circuit 54 to signal the secondary bus interface that it should continue the transfer. At anytime that all of the line buffers are full, the address comparator 58 and the line buffer sequencer 59 cooperate to cause the address comparator 58 to send an indication to the internal bus controller 54 that the bus master must wait on the secondary bus.

The address comparator 58, when it has an initial hit for empty line buffers 33, uses the current buffer furnished by the line buffer sequencer 59 to indicate to the line buffer control circuit 57 that line buffer 0 is to store the data. The signal indicating line buffer 0 is sent to the line buffer control circuit 57 where it activates a line buffer latch state machine LB0. There are four line buffer latch state machine of this type in the line buffer control circuit 57, one for each of the individual line buffers 3:0. The state machine LB0 causes the address on the secondary bus to be latched into the associated address line buffer 0 at the data doubleword space indicated by the two bits (3:2) of the latched address. The state machine LB0 then controls the transfer of data (which by this time appears on the data bus 18) to the doubleword space of the first line buffer 0 indicated by the bits 3:2 of the latched address.

Presuming that a second doubleword at a sequential address is next to be transferred, the address is presented to the internal bus controller 54 and then to the address comparator 58. The address comparator 58 compares the most significant bits of this address with the current address in the current line buffer (as pointed to by the sequencer 59) and signals a hit to the sequencer 59 and to the internal bus controller 54 as long as the next doubleword space in line buffer 0 is empty. The address comparator 58 furnishes the hit indication and the current line buffer to the line buffer control circuit 57. The state machine LB0 then attends to storing the second doubleword of data in the next doubleword space of the first line buffer 0 as indicated by the bits 3:2 of the address.

This operation continues with sequential addresses until the first line buffer is full. During each transfer operation by which data is stored in a particular line buffer 33 starting at a particular address, the signals described are sent to the state machine LB3:0 of the line buffer control circuit 57. The state machine records those doublewords containing valid data. A discussion of the line buffer latch state machines in the line buffer control circuit 57 which control the operation of the line buffers will illustrate how these conditions are made available to the circuit 60.

When the particular line buffer is filled as indicated by the highest order doubleword position being filled and the next sequential address is presented on the address bus of the secondary bus 18, the address comparator 58 compares the highest order address bits with address in the current line buffer pointed to by the sequencer 59. The address comparator 58 compares the address in the line buffer and determines an address mismatch has occurred. The address comparator 58 sends the mismatch indication to the sequencer 59, and the line buffer sequencer 59 responds by resetting its current address to the next available line buffer 1. The address comparator 58 then compares the address in this new line buffer, finds all the data invalid indicating that the buffer is empty, and indicates a hit at this new line buffer address to the line buffer control circuit 57. The signal is transferred to the line buffer LB1 latch state machine which controls the transfer of the new data to the first doubleword space of the new line buffer 1.

Simultaneously, when the line buffer 0 is filled, the line buffer control circuit 57 signals to the internal bus controller 54 that the buffer is full. The internal bus controller 54 signals the PCI interface that line buffer 0 has data which is ready to be transferred to the PCI interface. The arbiter of the PCI interface then arbitrates for the PCI bus 12. When the PCI bus is acquired, the PCI interface signals the line buffer control circuit 57 and receives back the starting address for the data to be transferred, the valid and invalid byte positions of data in the line buffer 0 so that the data at any unfilled doubleword may be ignored by target destination, and signals indicating how many doublewords are to be transferred beginning at the starting address provided for the transfer from the particular line buffer.

Once this information has been transferred to the PCI interface, the PCI interface begins transferring the data in the line buffer to its internal data buffers and then to the PCI bus. Since the PCI interface knows the number of doublewords involved in the flushing operation, it knows when the operation will be completed. One clock period before this occurs, the PCI interface signals that it is about to relinquish the PCI bus 12. When the flush is complete, the PCI interface as a PCI bus master relinquishes the PCI bus for arbitration. This allows other bus masters on the PCI bus to acquire access on the PCI before a next line buffer flush. However, if no other PCI bus master is requesting the PCI bus, then the PCI interface will probably continue with a next flush operation.

If at any time the PCI interface is unable to acquire the PCI bus, then the individual line buffers 33 will continue to fill. Ultimately, the internal bus control circuit might have to signal the secondary bus master that it must wait on the secondary bus. However, this is statistically very unlikely to occur because of the high priority of the bridge 17 on the PCI bus and the speed of transfers to the PCI bus when transfers occur in groups of multiple doublewords.

If all four line buffers are full, the address comparator when presented a new address for data to be transferred, compares the address to the current address, and generates a miss signal. The miss signal causes the sequencer 59 to sequence its pointer to the next line buffer which should become empty (i.e., LB0). Since the address comparator 58 receives signals from the line buffer control circuit 57 indicating that this buffer is full, the miss signal is transferred to the internal bus controller 54 which causes the secondary bus interface to generate a wait signal to the secondary bus master.

It is possible for an AFLUSH signal to be received at any time since an APIC interrupt is generally asynchronous to the operations on the secondary bus. It could occur when a secondary bus master was on the bus and transferring data to the PCI bus through the line buffers of the bridge 17. If at the time an AFLUSH signal is received the first line buffer 0 has filled and has not yet been flushed, the first doubleword of the next line buffer has been filled as is illustrated in FIG. 5, and the second doubleword (doubleword 1) of the second line buffer 1 (shown empty in FIG. 5) is being filled, the internal bus controller could respond in a number of ways. It might stop all operations related to the bridge transfer from the secondary bus. However, since the secondary bus master cannot be forced to relinquish the secondary bus, this would be of little use. Instead, the internal bus controller continues the operation of the transfer and continues to load the buffers.

A second possibility would be to delay acknowledging the APIC interrupt until after the secondary transfer has completed to the PCI bus. Since the secondary bus master cannot be forced off the secondary bus, the secondary bus master must complete the entire transaction through the bridge before it will relinquish the secondary bus. This might take a very long time and, since it would utilize the PCI bus, would delay the interrupt inordinately. Furthermore, in most cases, this is unnecessary because the high level interrupt is not usually one which will itself utilize the bridge 17. Consequently, in order to allow the interrupt to proceed, the circuitry of the present invention effectively takes a snapshot of the condition of the line buffers at the instant of the interrupt, flushes only those buffers which are filled at the time of the interrupt, and allows the remaining buffers to continue to fill during the flushing. Once the line buffers which are filled at the time of the interrupt have been flushed, the APIC interrupt acknowledge handshake is completed with the interrupt controller. This allows the interrupt controller to send the interrupt vector to the CPU 11 so that the CPU may proceed with servicing the interrupt. This allows the operations necessary to implementing the interrupt to proceed while allowing the secondary bus master to proceed with its transfer operation in so far as empty line buffer space is available.

Normally, the AFLUSH line is owned by the ESC chip 25 and is driven inactive. When an APIC receives an interrupt from a device, the ESC chip drives the AFLUSH line active for one clock period on the PCI bus 12 and then releases the line. The internal bus controller 54 receives the AFLUSH signal and drives the AFLUSH line active until all of the buffers in the bridge 17 and the bridges 15 which included valid data at the time of the interrupt have been flushed. It should be noted that the bridge 17 also responds to the AFLUSH signal by generating an external signal FLUSH-REQ# to any other bridges (such as bridge 14) in the system to cause those bridge to flush buffers. These bridges respond by generating a MEMACK# signal which is sent to the bridge 17 to indicate that buffer flushing has been completed. In this manner, the ESC chip 25 realizes that the interrupt is not to be acknowledged and serviced until flushing is complete.

In order to accomplish the flushing of only the data in the line buffers at the instant the interrupt occurs, a snapshot of the condition of the buffers is taken at the time the AFLUSH signal indicating the interrupt arrives. In order to take this snapshot, the line buffer control circuitry 57 circuitry includes a complex state machine. This state machine includes the individual line buffer latch state machines each of which records the condition of one of the four line buffers. In effect, each individual line buffer latch state machine senses that a particular line buffer is occupied by valid data. If this is the condition of a particular line buffer at the instant an AFLUSH signal is received, then that state machine produces a signal indicating that the particular buffer is to be included with the line buffers which are to be flushed for the particular APIC interrupt. The particular line buffer marked for flushing is also disabled so that new data may not be written to that buffer. A signal indicative of the condition of each doubleword of each line buffer is sent to the internal bus control circuit 54 in response to the AFLUSH signal indicating which of the buffers are to be flushed. The internal bus controller 54 signals the PCI interface to indicate that the flush operation is to commence for the first line buffer 0 to be flushed. The PCI interface arbitrates for the PCI bus; and, when it obtains access, transfers the data in the first line buffer 0 to the PCI interface and to the PCI bus 12. The PCI interface then relinquishes the bus for arbitration. If no higher priority request is outstanding, the PCI interface reacquires access to the PCI bus and proceeds to flush the first two doublewords in the second line buffer 1. During this period, access to the two line buffers 0 and 1 is denied to the secondary bus master. However, the secondary bus master may continue to fill the remaining line buffers 2 and 3. This allows the secondary bus to maintain the speed of its data transfer operation as well as possible during an interrupt.

Once those buffers are flushed, a signal is sent to indicate to the internal bus controller 54 that flushing is complete. The internal bus controller then drives the AFLUSH line inactive for one PCI clock cycle. This completes the interrupt acknowledge hand shake indicating to the ESC chip 25 that the buffer flush has been completed and the APIC interrupt vector can be sent to the CPU.

Figure 6:
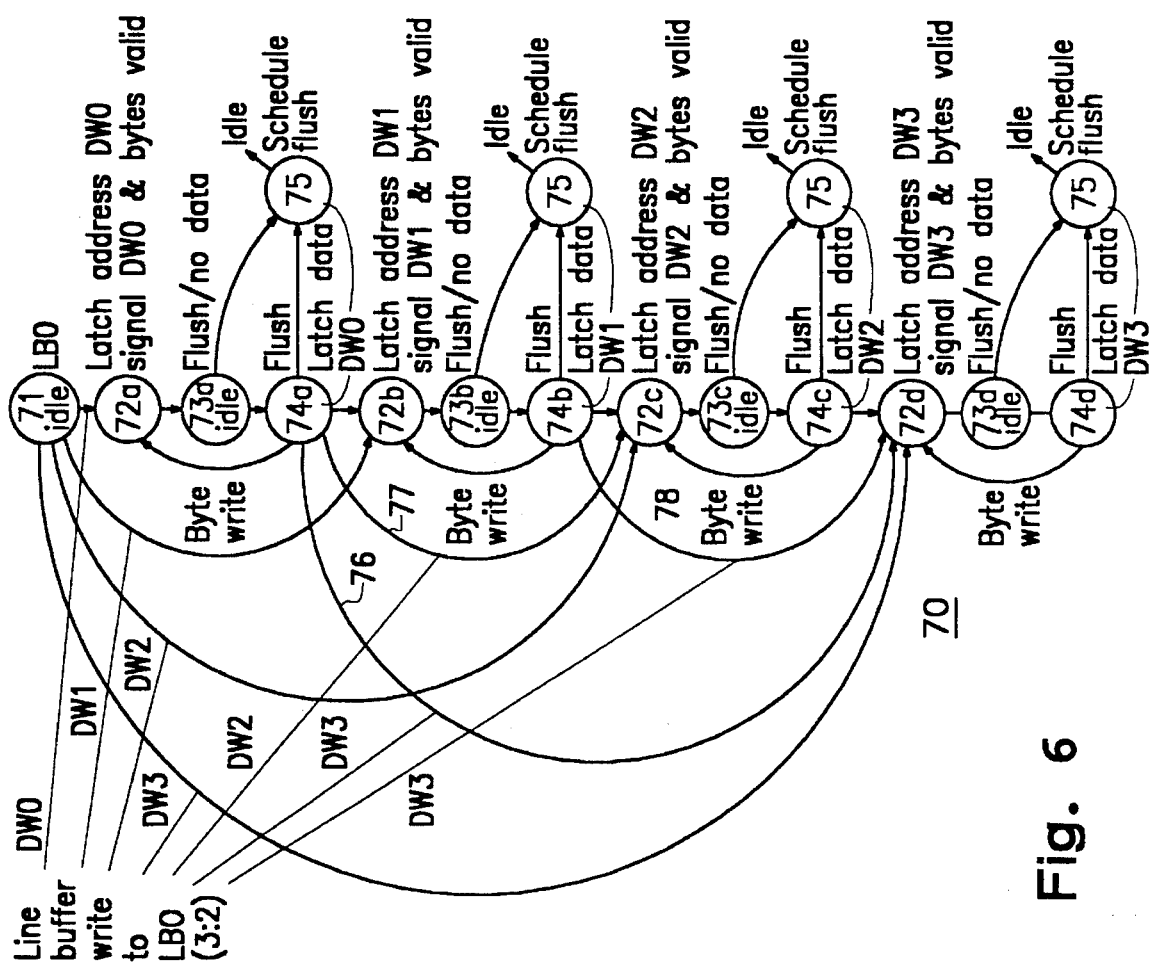
FIG. 6 is a diagram describing the operative states of a state machine utilized in implementing the invention.

FIG. 6 is a diagram of a first line buffer latch state machine 70 for storing and controlling the condition of one of the line buffers [3:0] so that a flush in accordance with the present invention may be accomplished. The state machine 70 illustrated is replicated for each of the individual line buffers 33 as described above. As may be seen, prior to use, the line buffer latch state machine 70 resides in a first idle state 71. The state machine 70 moves from this idle state in response to signals indicating a line buffer write cycle from a secondary bus master and that there has been an address comparison match for that particular line buffer 3:0. Thus, for the particular line buffer latch state machine 70 illustrated to be activated, the address match must be to line buffer 0. The state machine 70 may move to any of four possible states 72a–d each indicating an address at a different doubleword within the line buffer depending on the bits 3:2 of the address on the bus 18 which is being latched. In this state, the most significant twenty-eight bits of the address of the particular doubleword provided on the bus 18 are latched, the state machine 70 marks which of the bytes of the doubleword are valid, and the state machine asserts a signal that the particular doubleword is valid. If any condition requiring a flush has been received, the state machine also marks the line buffer as "do not touch." For any flush which is not asynchronous, this allows only data to be furnished corresponding to the doubleword address just latched. For a flush generated by an asynchronous interrupt such as an APIC interrupt, the state machine 70 also asserts a signal indicating that this buffer is not to be touched and is part of a snapshot window which must be flushed before the APIC interrupt vector may be sent to the CPU and serviced.

When the address has been latched, the state machine moves to a next idle state 73a–d waiting the latching of the data for the doubleword. If data arrives without a flush signal having been received, the machine moves to state 74a–d in which the data is latched for the particular doubleword. If the data arrives and a flush signal such as an AFLUSH signal has occurred before or while in state 73a–d, the state machine moves to a state 75. The machine also moves to state 75 from the states 74a–d if a flush occurs during the latching of data in state 74a–d. Moving to the state 75 from the state 73a–d provides for the situation in which a flush due to an APIC interrupt occurs after the address has been latched but before data has been received. The state machine 70 proceeds to latch the data into the particular doubleword space of the line buffer before flushing is allowed. In this manner, a buffer fill which is incomplete at the time of receipt of the flush signal will be completed so that the data may be sent to its final address before next operation is allowed.

If the machine moves to the state 75 from the state 73a–d, the machine 70 latches the data, and if it has not done so already marks the line buffer (e.g., LB0) as do not touch. In state 75, the state machine issues a signal initiating a flush. In the case of an asynchronous interrupt generated flush such as an APIC interrupt, the state machine 75 also generates a signal indicating that this line buffer is to be included in buffers in the snapshot window which are to be immediately flushed.

The state machine 70 proceeds in the same manner from each state 74a–c to the next state 72b–d in response to the next address hit for a particular doubleword as indicated by the bits 3:2 of the address on the bus 18. As may be seen, provision is made for non-sequential loads of the line buffers in the state machine. For example, paths 76, 77, and 78 lead to states at which data is stored in doublewords 2 or 3 instead of the next sequential doubleword. From the states 72b–d, the state machine 70 proceeds through each of its states in the manner described above presuming that no flush signal is received as a line buffer is filled sequentially. If a flush signal is received at any point in the process, the state machine proceeds to the state 75 in the manner described above. Ultimately, at state 74d, the state machine automatically moves to state 75 and generates a flush signal when the line buffer is full. It should also be noted that a path is provided from each state 74a–d back to the associated state 72a–d after data is latched so that the next byte of a doubleword may be latched in a situation in which data is being assembled byte by byte on the secondary bus.

As may be seen, at any time at which an AFLUSH signal is received, the state machine moves to the state 75 at which the flush operation is scheduled and a signal is generated which indicates that the particular line buffer should not be further touched by the secondary bus master. The particular doublewords which are to be flushed are ascertained from the valid data signals generated at each of the states 72a–d. The signal which precludes further use of that buffer allows the secondary bus master to continue to fill other buffers than those in use at the time the interrupt was asserted but lets no additional data be stored in the buffers being flushed.

Figure 7:
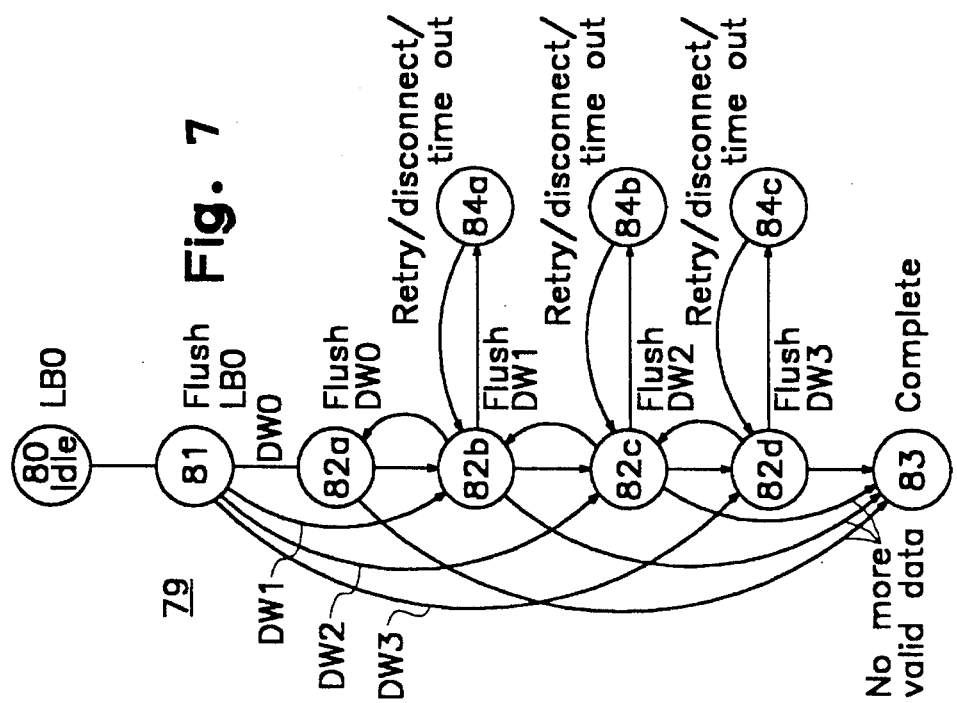
FIG. 7 is another diagram describing the operative states of a second state machine utilized in implementing the invention.

FIG. 7 is a diagram illustrating the states of a state machine 79 used for flushing the line buffers. The state machine 79 resides in the line buffer control circuitry of the PCEB chip 24. The diagram illustrates a state machine 79 for only one of the four line buffers 33. This state machine is also replicated for each of the line buffers [3:0]. The diagram shows a first idle state 80 in which the state machine 79 normally resides. When a flush is scheduled of the associated one of the line buffers 33 and particularly of the line buffer 0 illustrated, the state machine 79 moves to a state 81. If the line buffer 0 is scheduled to be flushed, if the cycle is a PCI destination cycle, if doubleword 0 is occupied as indicated by the valid data signals generated at states 72a–d of the state machine 70 of FIG. 6, then the state machine moves to a state 82a. If the doubleword 0 is not occupied by valid data, the state machine 79 moves to the state 82b if doubleword 1 is the first doubleword containing valid data, to the state 82c if doubleword 2 is the first doubleword containing valid data, or to the state 82d if doubleword 3 is the first doubleword containing valid data. The data in the selected doubleword is flushed, and the state machine 79 moves from the particular state 82a–d to the next state 82a–d if valid data in any succeeding doubleword of that line buffer. The state machine 79 circulates through the various states in the manner described until all of the doubleword storage positions between the first doubleword holding valid data and the last doubleword holding valid data have been flushed. It should be noted that the state machine moves to a state 84a–c whenever a retry, disconnect, or time out situation is encountered on the PCI bus 12. Ultimately, the state machine 79 moves to a state 83 in which the particular line buffer has been flushed.

Figure 8:
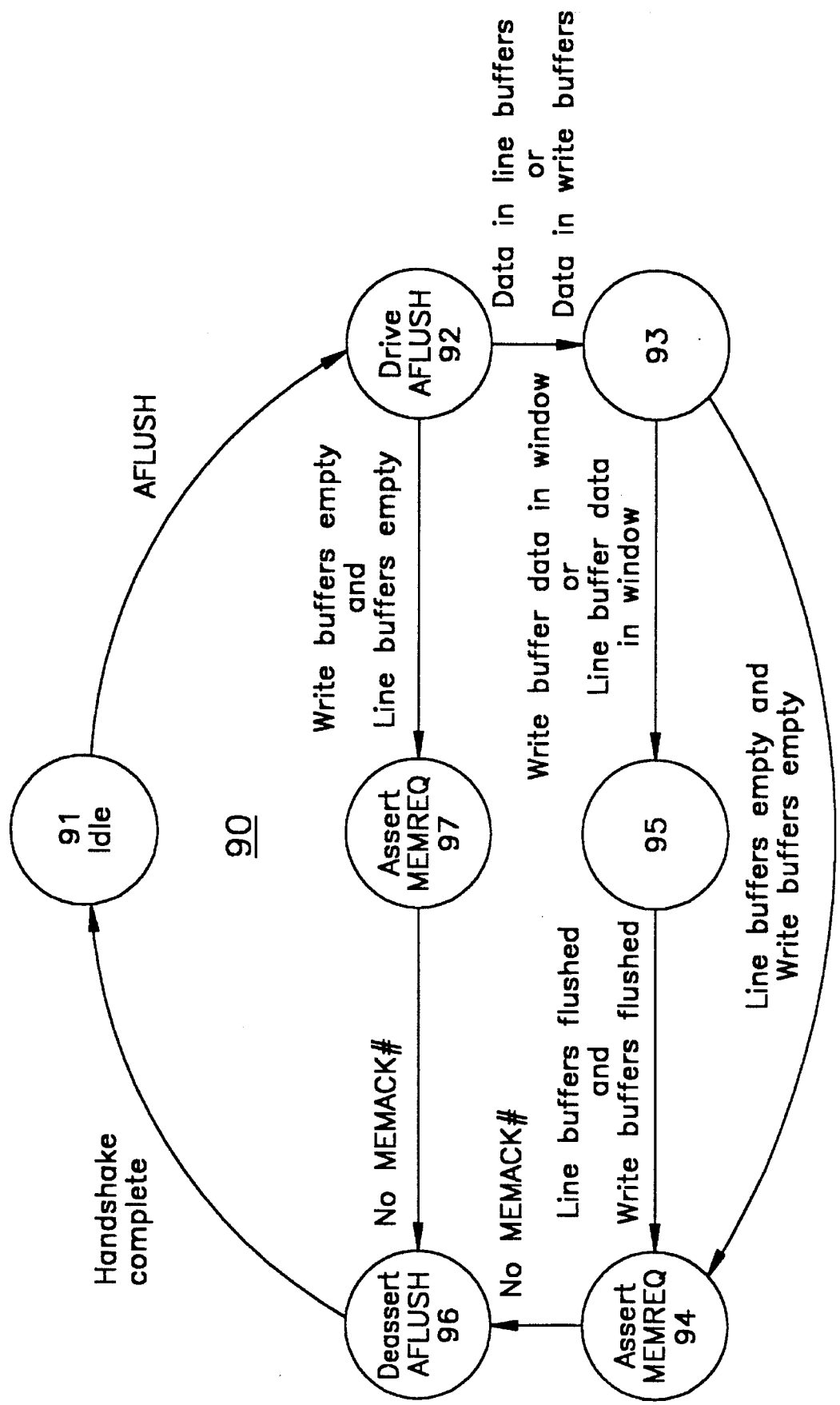
FIG. 8 is another diagram describing the operative states of a third state machine utilized in implementing the invention.

FIG. 8 is a state diagram of a state machine 90 referred to as an APIC flush state machine. The state machine 90 may be a part of the internal bus controller 54. The state machine 90 normally resides in an idle state 91. The state machine 90 moves from the idle state 91 in response to the receipt of an AFLUSH signal from the ESC chip 24 signifying an APIC interrupt. The state machine 90 moves to a state 92 at which it checks to determine whether the internal buffers of the bridge 17 (the line buffers and the posted write buffers) are occupied or not. If either set of buffers is occupied, the state machine 90 moves to a state 93 at which the logic checks to determine whether it is a line buffer or a posted write buffer which is occupied. If neither is occupied because the buffers have been flushed during the period between states 92 and 93, the state machine 90 moves to a state 94. If either buffer is occupied at state 93 and there is a buffer containing data to be flushed as indicated by signals generated at state 75 of state diagram 6, then the state machine moves to a state 95.

In state 95, the state machine 90 waits for either the buffers in the snapshot window of the line buffers to be flushed, the posted write buffers to be flushed, or any operation to be conducted through the direct path 32 illustrated in FIG. 2 is be completed. Once these operations (which are mutually exclusive) have been completed, the state machine moves to the state 94. In the state 94, the state machine 90 recognizes that the internal buffers of the bridge 17 have been flushed. It then asserts MEMACK# and waits for the generation of the MEMACK# signals which indicate that the other buffers of bridges on the PCI bus 12 such as those in the bridge 14 have been flushed. When the MEMACK# signals are received, the state machine 90 moves to a state 96.

The state machine 90 also moves to the state 96 from the state 92 through an intermediate state 97. If in state 92, both the line buffers and the posted write buffers are unoccupied and no operation is being conducted through the direct path 32 by either of the buses, then the state machine moves to the state 97 where it asserts a MEMREQ# signal and waits the receipt of the MEMACK# signals indicating buffers in other portions of the system have also been flushed In the state 96, the AFLUSH signal is rendered inactive. This is accomplished by the internal bus controller (which has held the AFLUSH signal low during the flushing operation) driving the AFLUSH signal line high for one clock and then releasing the line to complete the APIC flush handshake with ESC chip 25. The state machine moves from the state 96 to the idle state 91 at this point, and the operation is complete.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A bridge circuit adapted to be associated with first and second bus circuits, the bridge circuit comprising:
   a path including a plurality of buffers for storing information being transferred between the second bus and the first bus,
   each of the buffers storing information in a plurality of separately transferable increments,
   circuitry for flushing the buffers to write the information to its addressed destination,
   a circuit arrangement for detecting that an interrupt of a presently-running operation has occurred,
   a circuit arrangement for determining the state of each of the plurality of buffers when an interrupt occurs, and
   a circuit arrangement for flushing only those buffers of the plurality of buffers which had stored information for transfer when the interrupt occurred.

2. A bridge circuit as claimed in claim 1 in which the circuit arrangement for determining the state of each of the plurality of buffers when an interrupt occurs comprises a state machine for registering the condition of each buffer.

3. A bridge circuit as claimed in claim 1 in which the circuit arrangement for determining the state of each of the plurality of buffers when an interrupt occurs comprises a state machine for registering the condition of each portion of one of the plurality of buffers which may store individual increments of information.

4. A bridge circuit as claimed in claim 1 in which the circuit arrangement for flushing only those buffers which had stored information for transfer when the interrupt occurred comprises a state machine operating in response to the determination of the state of each buffer when the interrupt occurs, the state machine operating to flush a portion of each buffer which had stored valid data for transfer when the interrupt occurred.

5. A bridge circuit as claimed in claim 1 in which the circuit arrangement for flushing only those buffers which had stored information for transfer when the interrupt occurred comprises a state machine operating in response to the determination of the state of each buffer when the interrupt occurs, the state machine operating to flush each buffer which had stored valid data for transfer when the interrupt occurred.

6. The bridge circuit of claim 1 further comprising a circuit for directly coupling the first bus circuit to the second bus circuit.

7. A computer system comprising:
   a central processor;
   main memory;
   a first bus associated with the central processor and main memory;
   a second bus; and
   a bridge circuit adapted to transfer information between the first and second buses,
   the bridge circuit comprising
     a path including a plurality of buffers for storing information being transferred between the second bus and the first bus,
     circuitry for flushing the buffers to write the information to its addressed destination,
     a circuit arrangement for detecting that an interrupt of a presently-running operation has occurred,
     a circuit arrangement for determining the state of each of the plurality of buffers when an interrupt occurs, and
     a circuit arrangement for flushing only those buffers of the plurality of buffers which had stored information for transfer when the interrupt occurred.

8. A computer system as claimed in claim 7 in which the circuit arrangement for determining the state of each of the plurality of buffers when an interrupt occurs comprises a state machine for registering the condition of each buffer.

9. A computer system as claimed in claim 7 in which the circuit arrangement for determining the state of each of the plurality of buffers when an interrupt occurs comprises a state machine for registering the condition of each portion of one of the plurality of buffers which may store individual increments of information.

10. A computer system as claimed in claim 7 in which the circuit arrangement for flushing only those buffers which had stored information for transfer when the interrupt occurred comprises a state machine operating in response to the determination of the state of each buffer when the interrupt occurs, the state machine operating to flush each buffer which had stored valid data for transfer when the interrupt occurred.

11. A computer system as claimed in claim 7 in which the circuit arrangement for flushing only those buffers which had stored information for transfer when the interrupt occurred comprises a state machine operating in response to the determination of the state of each buffer when the interrupt occurs, the state machine operating to flush a portion of each buffer which had stored valid data for transfer when the interrupt occurred.

12. The computer system of claim 7 wherein said bridge circuit further includes a circuit for directly coupling the first bus to the second bus.

13. A computer system comprising:

processor means;

main memory means;

first busing means associated with the processor means and main memory means;

second busing means; and means for transferring information between the first and second busing means, the means for transferring comprising a path including a plurality of buffering means for storing information being transferred between the second bus and the first bus, means for flushing the buffer means to write the information to its addressed destination, means for detecting that an interrupt of a presently-running operation has occurred, means for determining the state of each of the plurality of buffering means when an interrupt occurs, and means for flushing only those buffering means of the plurality of buffering means which had stored information for transfer when the interrupt occurred.

14. A computer system as claimed in claim 13 in which the means for determining the state of each of the plurality of buffers when an interrupt occurs comprises state machine means for registering the condition of each buffer.

15. A computer system as claimed in claim 13 in which the means for determining the state of each of the plurality of buffers when an interrupt occurs comprises a state machine for registering the condition of each portion of one of the plurality of buffers which may store individual increments of information.

16. A computer system as claimed in claim 13 in which the means for flushing only those buffering means which had stored information for transfer when the interrupt occurred comprises state machine means operating in response to the determination of the state of each buffer when the interrupt occurs, the state machine operating to flush each buffer which had stored valid data for transfer when the interrupt occurred.

17. A computer system as claimed in claim 13 in which the means for flushing only those buffering means which had stored information for transfer when the interrupt occurred comprises state machine means operating in response to the determination of the state of each buffer when the interrupt occurs, the state machine operating to flush a portion of each buffer which had stored valid data for transfer when the interrupt occurred.

18. A bridge circuit adapted to be associated with first and second busing means, the bridge circuit comprising:

means for transferring information between the first and second busing means, including a path including a plurality of buffering means for storing information being transferred between the second bus and the first bus, each of the buffering means storing information in a plurality of separately transferable increments, means for flushing the buffer means to write the information to its addressed destination, means for detecting that an interrupt of a presently-running operation has occurred, means for determining the state of each of the plurality of buffering means when an interrupt occurs, and means for flushing only those buffering means of the plurality of buffering means which had stored information for transfer when the interrupt occurred.

19. A computer system as claimed in claim 18 in which the means for determining the state of each of the plurality of buffers when an interrupt occurs comprises state machine means for registering the condition of each buffer.

20. A computer system as claimed in claim 18 in which the means for determining the state of each of the plurality of buffers when an interrupt occurs comprises a state machine for registering the condition of each portion of one of the plurality of buffers which may store individual increments of information.

21. A computer system as claimed in claim 18 in which the means for flushing only those buffering means which had stored information for transfer when the interrupt occurred comprises state machine means operating in response to the determination of the state of each buffer when the interrupt occurs, the state machine operating to flush each buffer which had stored valid data for transfer when the interrupt occurred.

22. A computer system as claimed in claim 18 in which the means for flushing only those buffering means which had stored information for transfer when the interrupt occurred comprises state machine means operating in response to a determination of the state of each buffer when an interrupt occurs, the state machine operating to flush a portion of each buffer which had stored valid data for transfer when the interrupt occurred.

23. A method of flushing a plurality of data buffers used to transfer information between a first bus and a second bus in a computer system comprising the steps of:

detecting that an interrupt of a presenting-running operation has occurred, determining the state of the buffers when the interrupt occurs, and flushing only those buffers of the plurality of buffers which had stored information for transfer when the interrupt occurred.

* * * * *

UNITED STATES PATENT AND TRADEMARK OFFICE
CERTIFICATE OF CORRECTION

PATENT NO. : 5,535,341
DATED : July 9, 1996
INVENTOR(S) : Shah et al.

It is certified that error appears in the above-identified patent and that said Letters Patent is hereby corrected as shown below:

In column 12 at line 55 delete "untilled" and insert --unfilled--

Signed and Sealed this

Twelfth Day of November, 1996

Attest:

BRUCE LEHMAN

Attesting Officer

Commissioner of Patents and Trademarks